(12) United States Patent
Davis et al.

(10) Patent No.: US 8,182,937 B2
(45) Date of Patent: May 22, 2012

(54) BATTERY HAVING BATTERY-LIFE INDICATOR WITH FRAGRANCE

(75) Inventors: Stuart M. Davis, Norfolk, MA (US); Steven J. Specht, Brookfield, CT (US)

(73) Assignee: The Gillette Company, Boston, MA (US)

( * ) Notice: Subject to any disclaimer, the term of this patent is extended or adjusted under 35 U.S.C. 154(b) by 798 days.

(21) Appl. No.: 12/263,508

(22) Filed: Nov. 3, 2008

(65) Prior Publication Data
US 2010/0112421 A1    May 6, 2010

(51) Int. Cl.
*H01M 10/48* (2006.01)
(52) U.S. Cl. ............... 429/91; 429/90; 429/92; 429/93; 116/214; 116/210; 422/119
(58) Field of Classification Search .............. 429/90, 429/91, 92, 93; 116/214, 210; 422/119
See application file for complete search history.

(56) References Cited

U.S. PATENT DOCUMENTS

| | | | |
|---|---|---|---|
| 3,430,219 A * | 2/1969 | Powers | 340/590 |
| 5,368,953 A * | 11/1994 | Zaborney et al. | 429/90 |
| 6,500,576 B1 | 12/2002 | Davis et al. | |
| 6,879,855 B2 | 4/2005 | Schulman et al. | |
| 6,881,382 B2 * | 4/2005 | Goldstein et al. | 422/123 |
| 7,001,439 B2 | 2/2006 | Buckle | |
| 7,001,689 B2 | 2/2006 | Buckle | |
| 2003/0185716 A1 | 10/2003 | Goldstein et al. | |
| 2006/0187073 A1 | 8/2006 | Lin et al. | |
| 2006/0260534 A1 * | 11/2006 | Petrakis | 116/216 |
| 2008/0257718 A1 | 10/2008 | Chiang et al. | |

FOREIGN PATENT DOCUMENTS

| | | |
|---|---|---|
| JP | 04 206 451 | 7/1992 |
| JP | 04206451 A * | 7/1992 |
| JP | 2003 304645 | 10/2003 |

OTHER PUBLICATIONS

Chin et al., "Lithium Rechargeable Batteries as Electromechanical Actuators", Electrochemical and Solid-State Letters, vol. 9, No. 3, pp. A-134-A-138, 2006.
Linden "Factors Affecting Battery Performance", Handbook of Batteries, pp. 3.1-3.20, 1995.

* cited by examiner

*Primary Examiner* — Barbara Gilliam
*Assistant Examiner* — Zachary Best
(74) *Attorney, Agent, or Firm* — Fish & Richardson P.C.

(57) ABSTRACT

A battery includes a housing, a cathode and an anode within the housing, and a battery-life indicator including a fragrance that is released to indicate usage of the battery.

17 Claims, 7 Drawing Sheets

BATTERY HAVING BATTERY-LIFE INDICATOR WITH FRAGRANCE

TECHNICAL FIELD

This invention relates to batteries.

BACKGROUND

Batteries are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal air electrochemical cell, oxygen is reduced at the cathode, and a metal, such as zinc, is oxidized at the anode. Oxygen is supplied to the cathode from the atmospheric air external to the cell through air access ports in the battery housing. Metal oxide, such as zinc oxide or a zincate salt, is formed in the anode. Thus, the overall electrochemical reaction within a zinc-air electrochemical cell results in zinc metal being oxidized to zinc oxide or zincate ions and oxygen from the air being reduced to hydroxyl ions. While these chemical reactions are taking place, electrons are transferred from the anode to the cathode thereby providing power to the device.

SUMMARY

In one aspect, the invention features a battery that includes a housing, a cathode and an anode within the housing, and a battery-life indicator including a fragrance that is released to indicate usage of the battery. The battery-life indicator allows a user to determine the freshness or discharge status of a battery prior to or during the use of the battery in a device. In particular, the battery-life indicator is integrated within a primary battery and automatically indicates to the user the freshness or discharge status of the primary battery by fragrance release. The indication of usage of the battery does not require a readout and can be done without interrupting the use of the battery, for example, without removing the battery from a device in which it is being used.

In another aspect, the invention features a battery that includes a housing, a cathode and an anode within the housing, and an actuator cell electrically connected to the battery and associated with usage of the battery.

In another aspect, the invention features a battery that includes a housing, an anode and a cathode within the housing, and a fragrance designed to be released when usage of the battery reaches a pre-selected stage.

In another aspect, the invention features a battery-life indicator for use in a battery. The battery-life indicator includes an actuator cell, a capsule containing a fragrance agent, and a mechanism in communication with the actuator cell and the capsule to release fragrance of the fragrance agent from the capsule in response to discharge of the actuator cell.

In another aspect, the invention features an actuator cell that includes a flexible housing, an anode and a cathode within the housing, and an electrolyte disposed within the anode and the cathode. The actuator cell is rechargeable and is capable of changing its volume by at least about 8%, e.g., about 8% to about 20%, when it is discharged.

In another aspect, the invention features an actuator cell that includes a housing and an anode and a cathode within the housing. The anode is in the form of a corrodible link that is corroded to break when the actuator cell discharges.

In another aspect, the invention features a method for determining usage of a battery. The method includes releasing a fragrance from the battery when the usage of the battery reaches a pre-selected stage.

In another aspect, the invention features a metal-air battery that includes an outer housing and an inner housing concentric to the outer housing. The outer housing has a first set of ports and the inner housing has a second set of ports and one of the housings is slidable with respect to the other housing along a sliding direction parallel to the longitudinal axis of the battery.

In another aspect, the invention features a metal-air battery that includes (a) an anode that can be oxidized, (b) a cathode that can reduce oxygen, (c) a housing enclosing the anode and the cathode and including one or more ports that when open allow air to enter the battery to contact the cathode, and (d) an actuator cell including an anode and a cathode that closes the ports when the battery is not in use.

Embodiments may include one or more of the following features. The battery-life indicator can include an actuator cell, a supporting plate and a piston in connection with the actuator cell and the supporting plate, a spring supported by the supporting plate and located between the battery and the supporting plate, a capsule containing a fragrance agent, and a pierce point connected to the supporting plate. The spring and the pierce point can be in communication with the actuator cell and the capsule. The fragrance can include mint, camphor, citronellol, onion, garlic, phenol, amines, thiols, a ripened fruit fragrance, apple, orange, grape, a cooked food fragrance, cooked rice, cooked meat, cooked vegetable, a baked pie or mixtures thereof.

Embodiments may also include one or more of the following features. The usage of the battery can include a voltage of the battery. The pre-selected stage can include a pre-selected voltage. The battery can include a hollow pip external to the housing and be a positive terminal of the battery, and the battery-life indicator can be at least partially located within the hollow pip. The battery can include a label about the housing and the battery-life indicator can be between the housing and the label. The battery-life indicator can be incorporated in a battery to indicate a usage of the battery.

Embodiments may also include one or more of the following features. The metal-air battery also includes an actuator cell connected to the inner housing and capable of sliding the inner housing. The actuator cell has an open circuit voltage of about 0.9 V to about 1.35 V. The ports in the first and second sets have similar sizes and density in the sliding direction. The metal air battery also includes a third housing concentric to the inner housing, in which the inner housing is between the outer housing and the third housing.

In other aspects, the invention also features methods of making and using the batteries, battery-life indicators, and actuator cells described above.

A battery that is meant to be discharged, e.g., to exhaustion, only once, and then discarded is a primary battery. Primary batteries are not intended to be recharged. Primary batteries are described, for example, in David Linden, Handbook of Batteries (McGraw-Hill, 2d ed. 1995).

All publications, patent applications, patents, and other references mentioned herein are incorporated by reference herein in their entirety.

Other features and advantages of the invention will be apparent from the following detailed description, and from the claims.

DESCRIPTION OF DRAWINGS

Like reference symbols in the various drawings indicate like elements.

DETAILED DESCRIPTION

Figure 1:
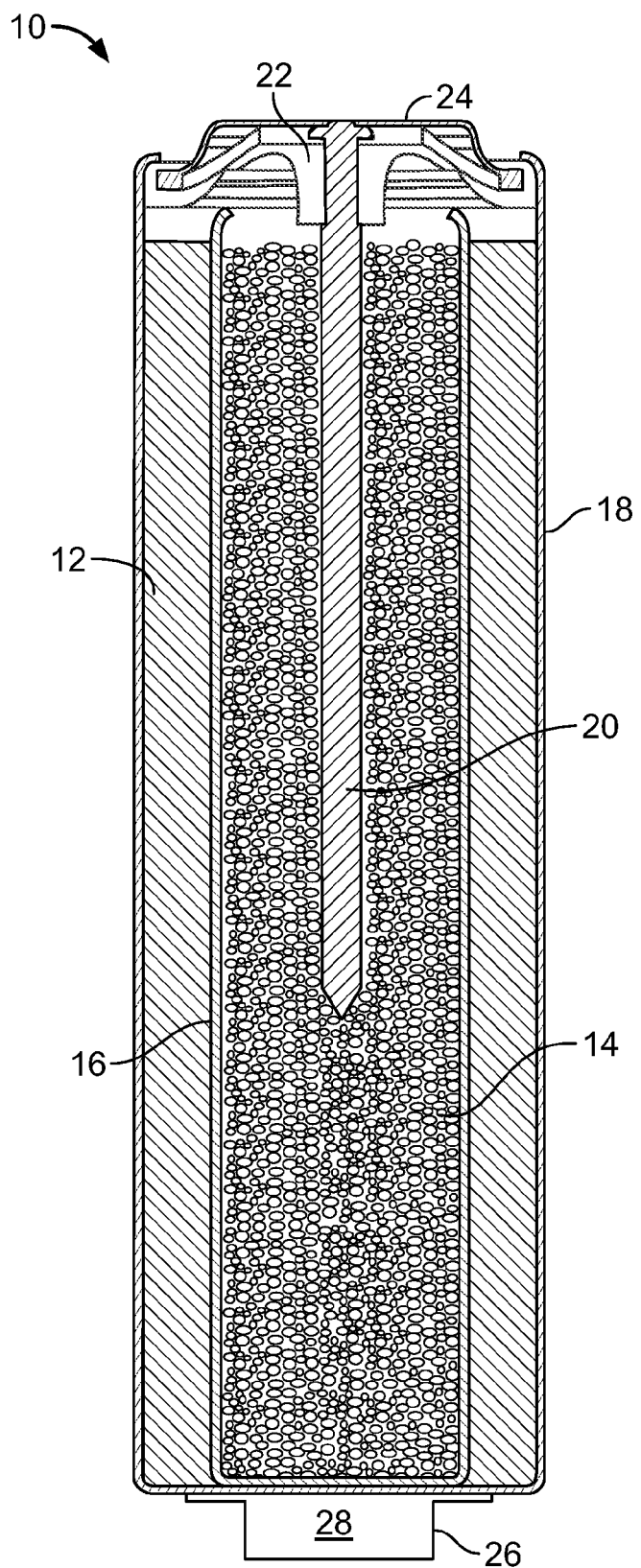
FIGS. 1 and 7 are schematic diagrams of batteries.

Referring to FIG. 1, battery 10 includes a battery-life indicator 28 (detail not shown) integrated within a hollow pip 26 of battery 10. Hollow pip 26 acts as a positive terminal of battery 10 and is external to a housing 18 of battery 10. In use, battery-life indicator 28 automatically provides an indication through fragrance release, to a user about usage, for example, freshness or state of discharge of battery 10 without interrupting the use of the battery. Battery 10 can be an alkaline battery, for example, a AA, AAA, AAAA, C, or D battery, which includes a cathode 12, an anode 14, and a separator 16 within the housing 18. Battery 10 also includes current collector 20, seal 22, and a negative metal end cap 24, which serves as the negative terminal for the battery and is at another end of the battery opposite from the positive terminal. An electrolytic solution is dispersed throughout battery 10. Battery 10 can also be other types of batteries, for example, a lithium battery, a Leclanche zinc-carbon battery, a zinc chloride "heavy duty" battery, a zinc-silver oxide battery or a zinc-air battery.

Figure 2:
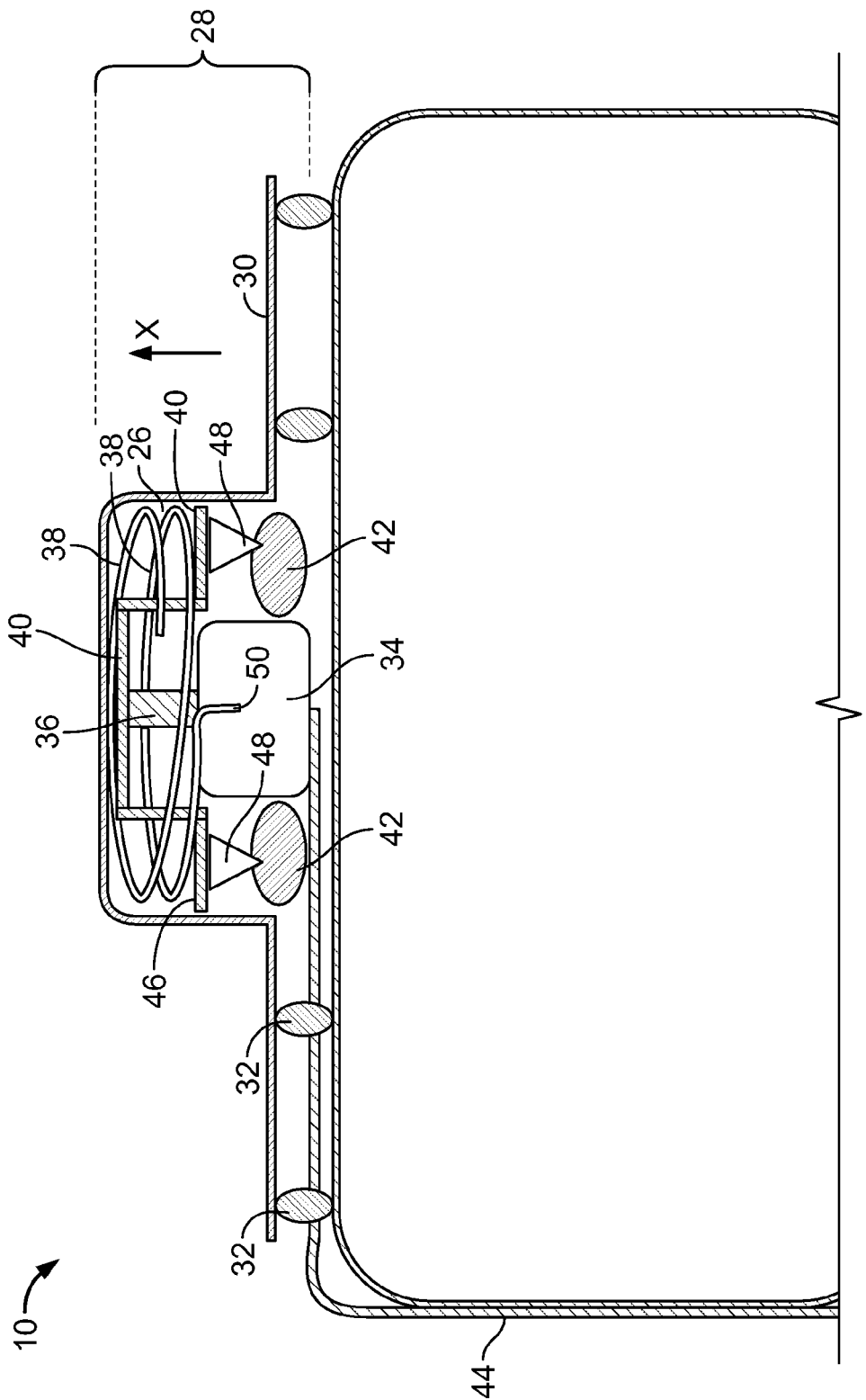
FIGS. 2, 4, 5, and 6 are schematic diagrams of a portion of a battery containing a battery-life indicator.

Referring to FIG. 2, pip 26 includes a metal shell 30 that is welded onto an external of housing 18 via weld beads 32 and a hollow internal space in which battery-life indicator 28 is located. Battery-life indicator 28 includes an actuator cell 34 connected to battery 10 in parallel to monitor the discharge, for example, indicated by a voltage, of battery 10. For example, actuator cell 34 includes a positive contact 50 extending from the cell and contacts with flange portion 30 of the pip 26. In some embodiments, contact 50 is curled into the form of a spring 38, outside of actuator cell 34, having an expansion direction y parallel to the longitudinal axis of battery 10 and is in electrical contact with metal flange 30 of pip 26. In some embodiments, spring 38 can be a component independent of, but electrically connected with, contact 50. The negative terminal of actuator cell 34 is electrically connected to the negative terminal 24 (FIG. 1) of battery 10 using an insulated lead wire 44. Other forms of electrical contacts can be used to provide a parallel connection between actuator cell 34 and battery 10.

Actuator cell 34 can include a flexible housing that changes its volume with the internal material within the housing or a rigid housing having a piston connected to the internal material of the housing. In the example shown in FIG. 3, actuator cell 34 includes a flexible housing 52 coated with a thin metal plating 54, a cathode 56, an anode 58, and a separator 60 made, for example, of BH40-R (Nippon Kodoshi Corp., Japan), separating cathode 56 and anode 58. An electrolyte solution 62 is dispersed in cathode 56, anode 58 and separator 60. A current collector 64 made, for example, of magnesium or copper, is disposed in anode 58 and connected to an anode feed through 66 made, for example, of magnesium and acting as a negative terminal of cell 34. A cathode feed through 68 made, for example, of nickel, is in electrical contact with cathode 56 and acts as a positive terminal of cell 34. The portion of feedthroughs 66 and 68 that extend outside of housing 52 can, for example, be thin and coiled wires, so that cell 34 can expand and contract in response to volume changes without constraint. Feedthroughs 66 and 68 can be electrically connected to negative terminal 24 and positive terminal 26 of battery 10, respectively, as previously described. One or more sealants 70 made, for example, of asphalt, can be placed adjacent to the locations where the feedthroughs extend out of housing 52.

Actuator cell 34 can be an electrochemical cell. Anode 58 can include an anode active material, for example, zinc, iron, nickel, indium, cadmium, lead, bismuth, aluminum, magnesium, calcium, strontium, lithium, sodium, potassium and others in the form, for example, of a foil, a sheet, a sponge, a woven screen, fibers, a powder or a slurry. Various alloy combinations of the foregoing metals may also be employed. Cathode 56 can include a cathode active material, for example, $\gamma MnO_2$, $\beta MnO_2$, $\gamma NiOOH$, $\beta NiOOH$, $Fe_2O_3$, FeO, $Bi_2O_3$, $Cu_2O$, CuO, $Ag_2O$, AgO, CoO, $Co_2O_3$, PbO, $Pb_2O_3$, $Pb_3O_4$, and others. The cathode can be hard and rigid, as in a conventional alkaline-$MnO_2$ cell, or it can be a soft paste, as in a conventional Leclanche cell. Electrolyte solution 62 can include an aqueous alkaline, aqueous acid, aqueous salt electrolyte, or non-aqueous electrolyte. Actuator cell 34 can have a normal open circuit voltage selected based on the terminal (final) operating voltage of a device in which battery 10 is used. The term "normal open circuit Voltage", as used herein, is the open circuit voltage of a fresh actuator cell when undischarged and unconnected to a battery. In this condition, the characteristic Voltage of the particular electrochemical couple employed in the actuator cell can be displayed. Once the actuator cell 34 is connected in parallel to battery 10, it is charged or discharged by battery 10 until the open circuit Voltage of the actuator cell matches that of the battery. For example, when battery 10 is a AA battery for use in devices, such as a motorized toy, or a flashlight that have terminal operating voltages about 0.7 V to about 0.9 V, the normal open circuit voltage of actuator cell 34 is selected to be about 0.7 V to about 0.85 V In some embodiments, the components of actuator cell 34 can be selected to have an open circuit voltage up to about 1.1 V. When battery 10 is in use, actuator cell 34 does not discharge until the operating voltage of battery 10 falls below the normal open circuit voltage of actuator cell 34. In some embodiments, actuator cell 34 is rechargeable. For example, when the open circuit or operating voltage of battery 10 increases above that of actuator cell 34, e.g., when battery 10 is recharged from a discharged state, battery 10 will then charge actuator cell 34.

The active materials for each component of actuator cell 34, i.e. the electrochemical couple, can be selected so that in combination they provide a desired open circuit voltage for cell 34. For example, actuator cell 34 having a normal open circuit voltage of about 0.77 V can include a bismuth metal slurry in anode 58 and a cathode active material, e.g., $\gamma MnO2$ mixed with carbon black and potassium hydroxide electrolyte solution that form a soft cathode paste 56. Supplemental potassium hydroxide electrolyte solution 62 can be added to anode slurry 58, cathode paste 56, or separator 52. The materials for the components of actuator cell 34 are also selected based on a volume change of the materials during discharge of cell 34. It is desirable that after a complete discharge of the cell, a total volume of the materials contained in all components of actuator cell 34 changes, for example, increases or decreases, by about 8% to about 30%, for example, by about 15% to about 20% or by about 17.5% of the total volume prior to the discharge of cell 34. The total volume of actuator cell 34 can be designed based on the need, for example, the actuation voltage and the physical restriction brought by battery 10, e.g., size of the pip. When battery 10 is an AA cell, actuator cell 34 can have a total volume of about 0.05 cm$^3$ to 0.2 cm$^3$.

Figure 3:
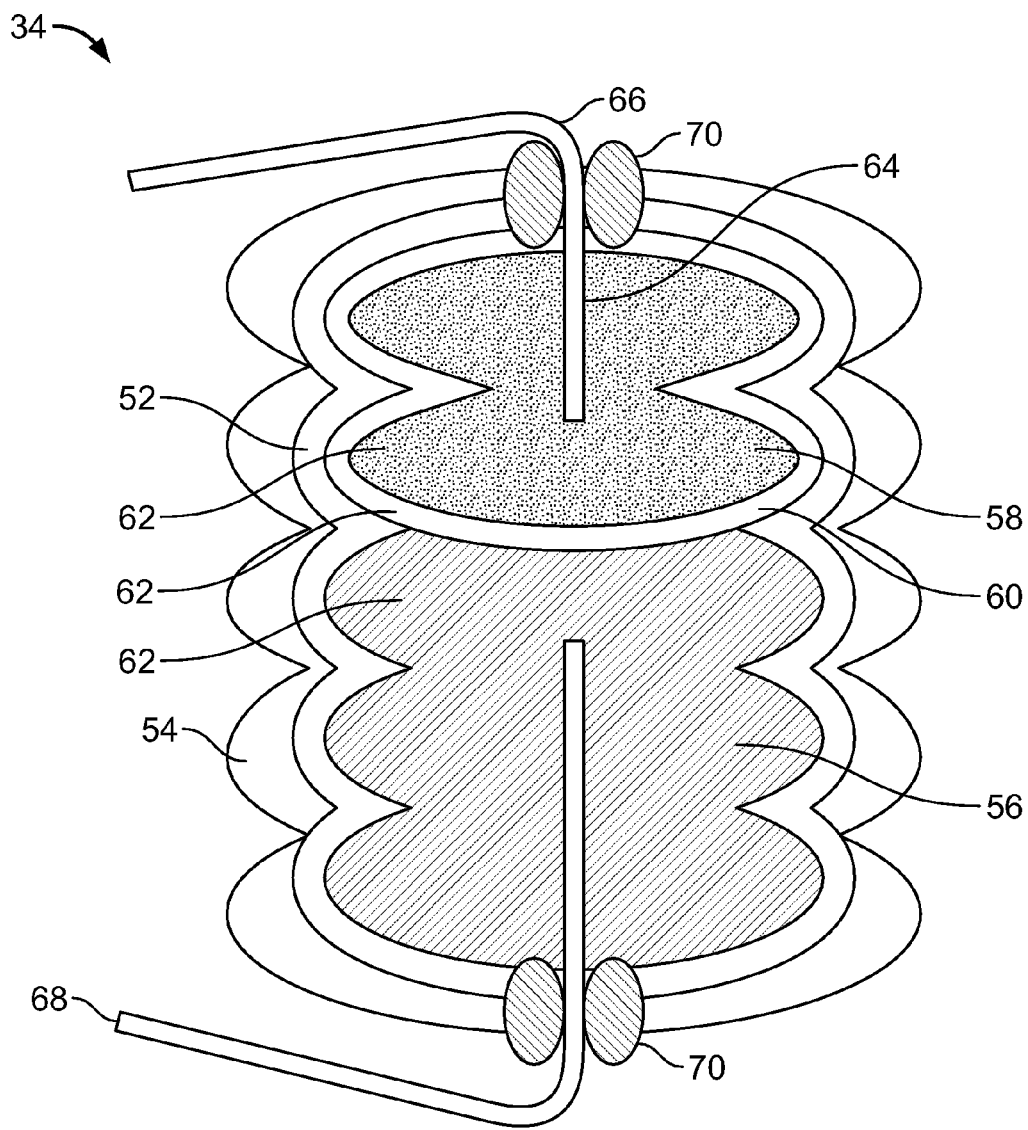
FIG. 3 is a schematic diagram of an actuator cell.

Flexible actuator cell 34 of FIG. 3 changes its shape and volume, for example, swells or shrinks when the cell discharges. Flexible housing 52 includes an elastomer, for example, a plastic or rubber bellows, and wraps tightly about the components, e.g., cathode 56 and anode 58, of actuator cell 34. Metal plating 54 includes, for example, nickel, electroless nickel or copper, and provides a moisture barrier for cell 34 by preventing moisture from entering or leaving the cell. Metal plating 54 is thin and has a thickness, for example, of at most 50 microns so that housing 52 retains its flexibility, for example, being expandable or shrinkable. Metal plating 54 is electrically isolated from one or both of the feedthroughs 60 and 68. When the total volume of the materials contained in all components of cell 34 changes, flexible housing 52 with metal coating 54 swells or shrinks following the total volume change so that the volume of cell 34 changes by a similar, e.g., the same, amount as the total volume of the materials.

The normal open circuit voltage of cell 34 sets an activation standard for the discharge of cell 34 and therefore the volume and/or shape change of cell 34. The volume change of cell 34 activates release of fragrance as explained below and is an indicator to a user about the discharge state of battery 10.

Referring back to FIG. 2, the actuator cell 34 of battery-life indicator 28 having a flexible housing or a rigid housing can also include a piston 36 having one end disposed within actuator cell 34, for example, within the paste-like positive cathode of actuator cell 34, and the other end attached to a spring supporting plate 40. Spring supporting plate 40 has a disc-like central portion extending along the x direction and located within compression spring 38 and a flat, circular flange portion 46, lying under the compression spring and also extending along the x direction. The disc-like central portion and the flange are connected by a circular ring portion extending in the y direction, e.g., parallel to the expansion/compression direction y of spring 38. Pierce points 48 are attached to the underside of the flange portion 46 of the spring supporting plate 40. Piston 36 can move up and down along the y direction following the volume and/or shape change of actuator cell 34. Spring supporting plate 40 can move with piston 36.

In addition, battery-life indicator 28 contains one or more fragrance containing capsules 42, each pierce point 48 being in the vicinity of a corresponding capsule 42 along the x direction. In some embodiments, there can be a single fragrance containing capsule in the form of a torus which is positioned under one or more pierce points. The relative positions of each pierce point 48 and its corresponding capsule 42 can be selected based on the discharge properties of actuator cell 34. For example, if actuator cell 34 shrinks when discharging, each pierce point 48 can be placed above its corresponding capsule 42; while if actuator cell 34 swells when discharging, each pierce point 48 can be placed below its corresponding capsule 42. Spring 38 can have an initial state of being compressed and exerts a force on portion 46 of plate 40 along the y direction, which is balanced by the support of piston 36. When the volume and/or shape of actuator cell 34 changes, the movement of piston 36 and the expansion of spring 38 activates pierce points 48 to pierce the corresponding capsule 42 to release the fragrance. In some embodiments, metal shell 30 does not completely seal battery-life indicator 28 within the internal space of pip 26 so that the released fragrance can escape battery 10 to a user.

Each capsule 42 can be made, for example, of a fragile foil or foil laminate and houses a fragrance agent in the form, for example, of a liquid. The foil or foil laminate is impermeable to the fragrance of the fragrance agent but can be pierced readily by a sharp point, for example, pierce points 48. Examples of suitable foil or foil laminate include Polyethylene/Aluminum/Polyethylene, Mylar/Aluminum/Polyethylene, Mylar/Copper/Mylar. The fragrance agent can provide a sharp fragrance, for example, mint, camphor, citronellol, onion, garlic, phenol, amines, and thiols, a fresh flower or blossom fragrance such as lilac, lavender, apple blossoms, and cherry blossoms, a ripened fruit fragrance, for example, orange, grape, pineapple, lemon and others, a cooked food fragrance, for example, cooked rice, cooked meat, cooked vegetable, apple pie, cherry pie or other fragrance or mixtures of fragrances to indicate the discharge completion of battery 10. Each capsule 42 can have a toroidal shape and a size of about 0.02 cm$^3$ to about 1.0 cm$^3$ so that a sufficient amount of fragrance agent is housed to provide a clear indication of usage of battery 10 to the user.

In one embodiment, piston 36 can be made of an insulating material such as a plastic, glass or ceramic composition. In this case, electrical contact is established between the positive terminal of actuator cell 34 and the positive pip 26 or housing 18 of the battery 10 by another conducting element, for example spring 38. In another embodiment, piston 36, spring 38, spring support plate 40, and shell 30 each can be made of a conductive material to provide proper electrical contacts between components of battery 10 and battery-life indicator 28. Suitable conductive materials include, for example, carbon steel, nickel plated steel, stainless steel, and carbon filled plastic. Piston 36 can be cylindrical and have a diameter of about 1 mm to about 5 mm. Piston 36 having a large diameter can provide a large force in response to the volume change of the internal components of actuator cell 34, and therefore to the usage of battery 10, in order to activate the piercing of capsules 42. Piston 36 having a small diameter can move over a long distance, that is, have a long "throw", in response to the volume change of the internal components of actuator cell 34. When the actuator cell has a flexible housing like that of FIG. 3, a short, wide cell can be employed when a large force but limited "throw" is required to pierce the fragrance containing capsule; whereas a tall, narrow cell can be employed where more "throw" but less force is required.

The fragrance release from the capsules 42 can be continuous from the time the voltage of battery 10 falls below the open circuit voltage of actuator cell 34 to the time that battery 10 stops operating in a device being used by a user. Actuator cell 34 discharges and changes its volume or shape continuously, for example, from a small amount at the beginning of the discharge to a large amount subsequently as the voltage of battery 10 continues to drop. Capsule 42 is then pierced continuously from having an opening that allows release of a small amount of fragrance, e.g., for signaling to the user the close-to-complete usage state of battery 10, to having an opening that releases a significant amount of fragrance, e.g., for indicating to the user the complete usage of the battery. In some embodiments, a series of pierce points having variable lengths may be employed so that the longest pierce point pierces a first fragrance capsule after which the next longest pierce point pierces a second fragrance capsule and so on, until the shortest pierce point pierces the last fragrance capsule, during a time period corresponding to the last stages of battery life. In this arrangement, different fragrances may be employed in each of the fragrance capsules to signal a progressive decline in the remaining battery life.

Figure 4:
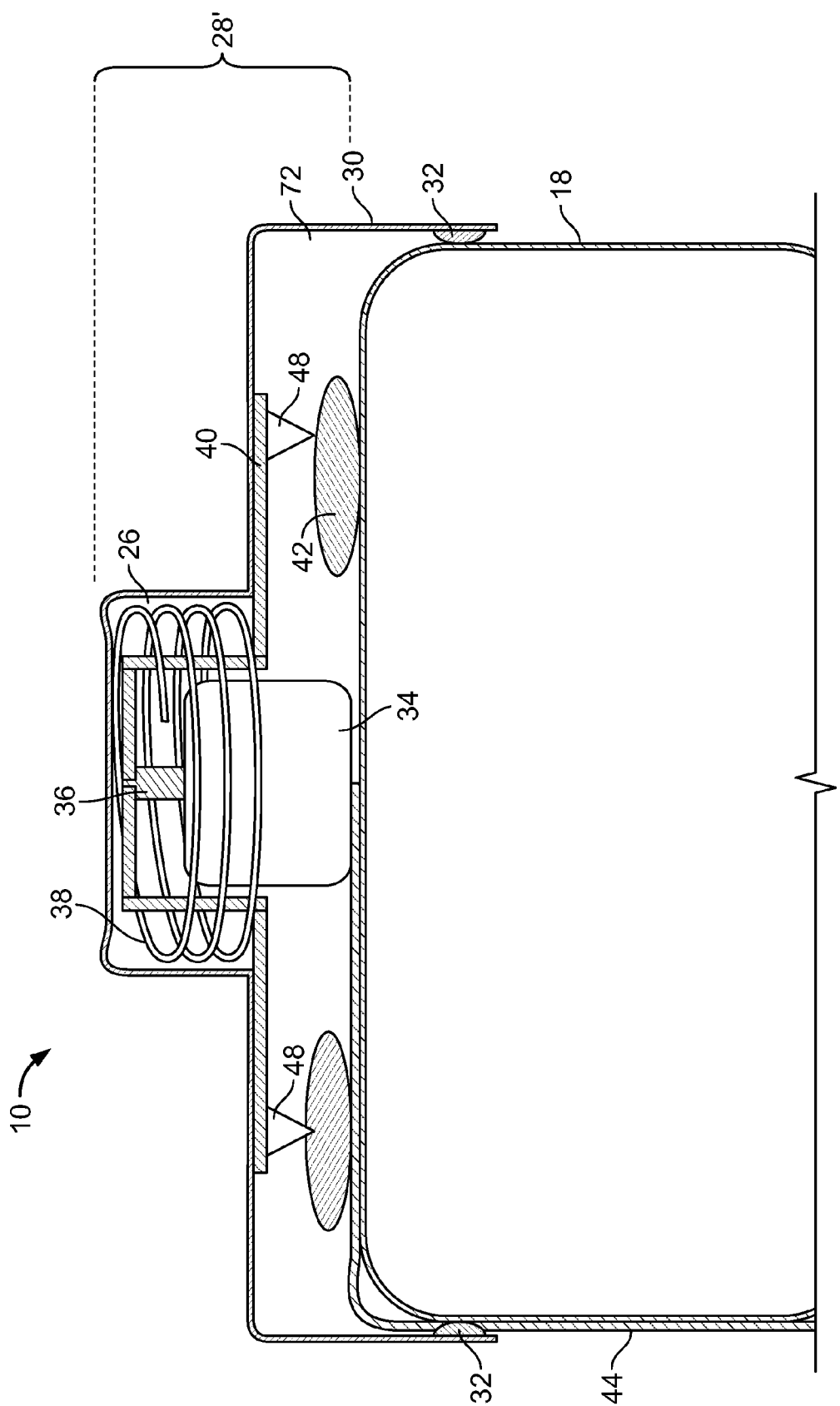

Referring to FIG. 4, alternative to the arrangement of battery 10 shown in FIGS. 1 and 2, battery 10 can also include an elevated shell 30 relative to housing 18 of battery 10 at the positive terminal to provide a space 72. Space 72 provides additional volume to house a battery-life indicator 28' including components having larger sizes than those of battery-life indicator 28 of FIG. 2. For example, a wider piston (higher force) or longer piston (greater throw) 36 can be used to increase the sensitivity of the gauge to the discharge of actuator cell 34 and a larger amount of fragrance agent can be contained in larger capsules 42 to provide more fragrance release. Battery-life indicator 28' includes similar materials for each component and functions in the same manner as battery-life indicator 28.

Figure 5:
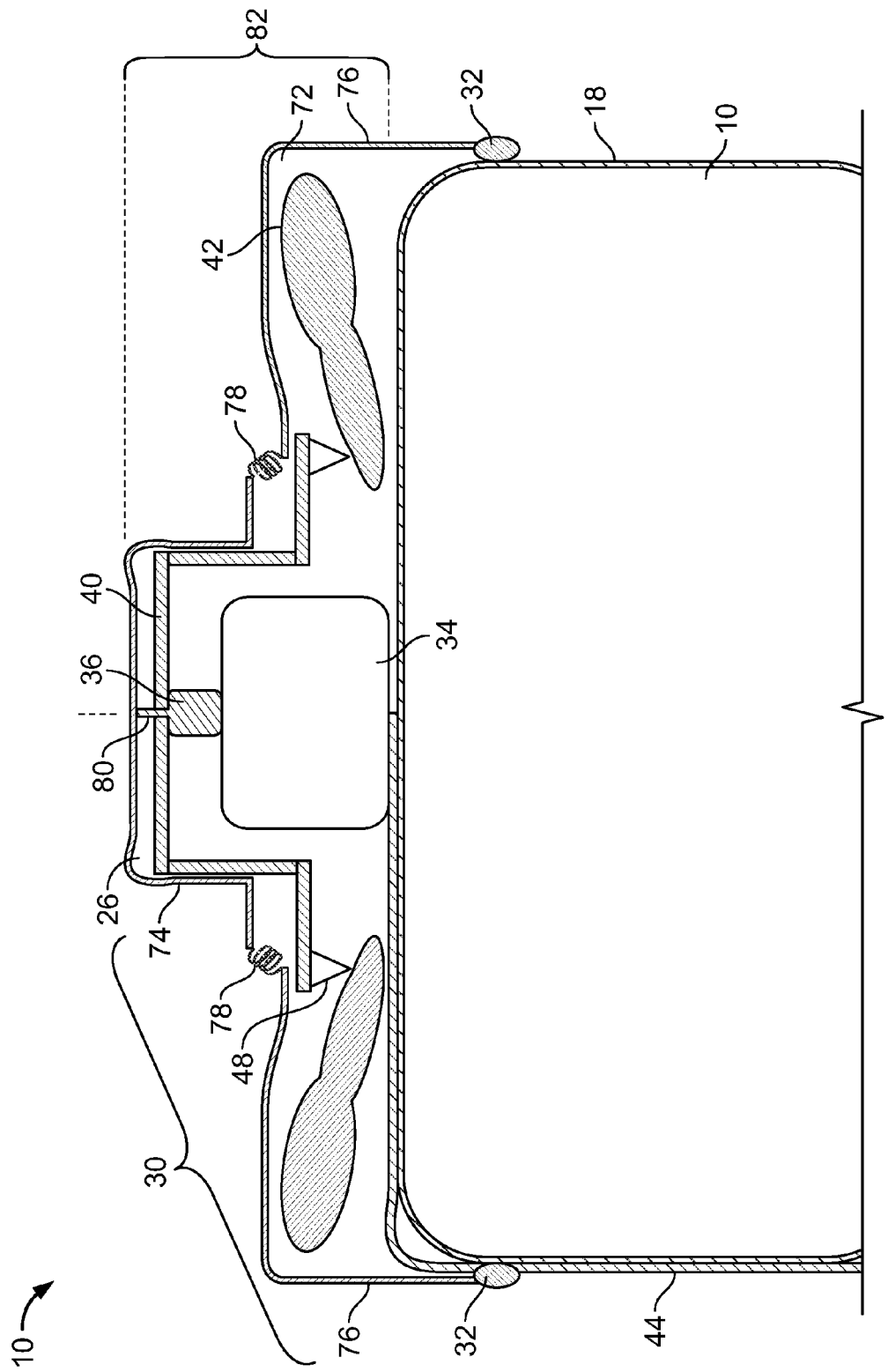

Referring to FIG. 5, alternative to the arrangement of battery 10 shown in FIG. 4, elevated shell 30 of FIG. 5 is similar to elevated shell 30 of FIG. 4, except that the elevated shell 30 of FIG. 5 is formed with a plurality of built-in spring elements 78 situated between the central hat shaped portion of the shell 74 and the outer flange portion of the shell 76. These spring elements 78 are arranged in a discontinuous pattern, around the inner periphery of flange portion 76 and exert a downward force on support plate 40. Between spring elements 78 there remains a series of rigid connections (not shown) between the central hat shaped portion 74 and the flange portion 76, so that the two portions of the elevated shell are rigidly attached to each other. A battery-life indicator 82 having an actuator cell 34, a piston 36, a spring supporting plate 40 with pierce points 48, and fragrance containing capsules 42, each as described above, is placed in space 72 similar to battery-life indicator 28' of FIG. 4. Battery-life indicator 82 also includes a positive lead 80 made of a conductive material emerging from piston 36 and connected to central hat shaped portion 74 of shell 30. Lead 80 provides a positive electrical connection between the positive pole of actuator cell 34 and battery 10. When actuator cell 34 starts discharging, its internal components shrink to a smaller volume, and piston 36 retracts in response to pressure from springs 78, causing plate 40 to move downward to activate piercing of capsule 42. Capsules 42 can have different shapes than toroidal based on, for example, physical limitations within space 72.

Other arrangements of battery 10 can be used to achieve the function of battery-life indicators 28, 28', or 82 as an indicator of discharge status of battery 10. Battery-life indicators with modifications can also be used to achieve similar functions. For example, if actuator cell 34 swells when discharging, the arrangement of components of battery-life indicator can be different than those described above. In some embodiments, springs 38 and 78 can be optional.

Figure 6:
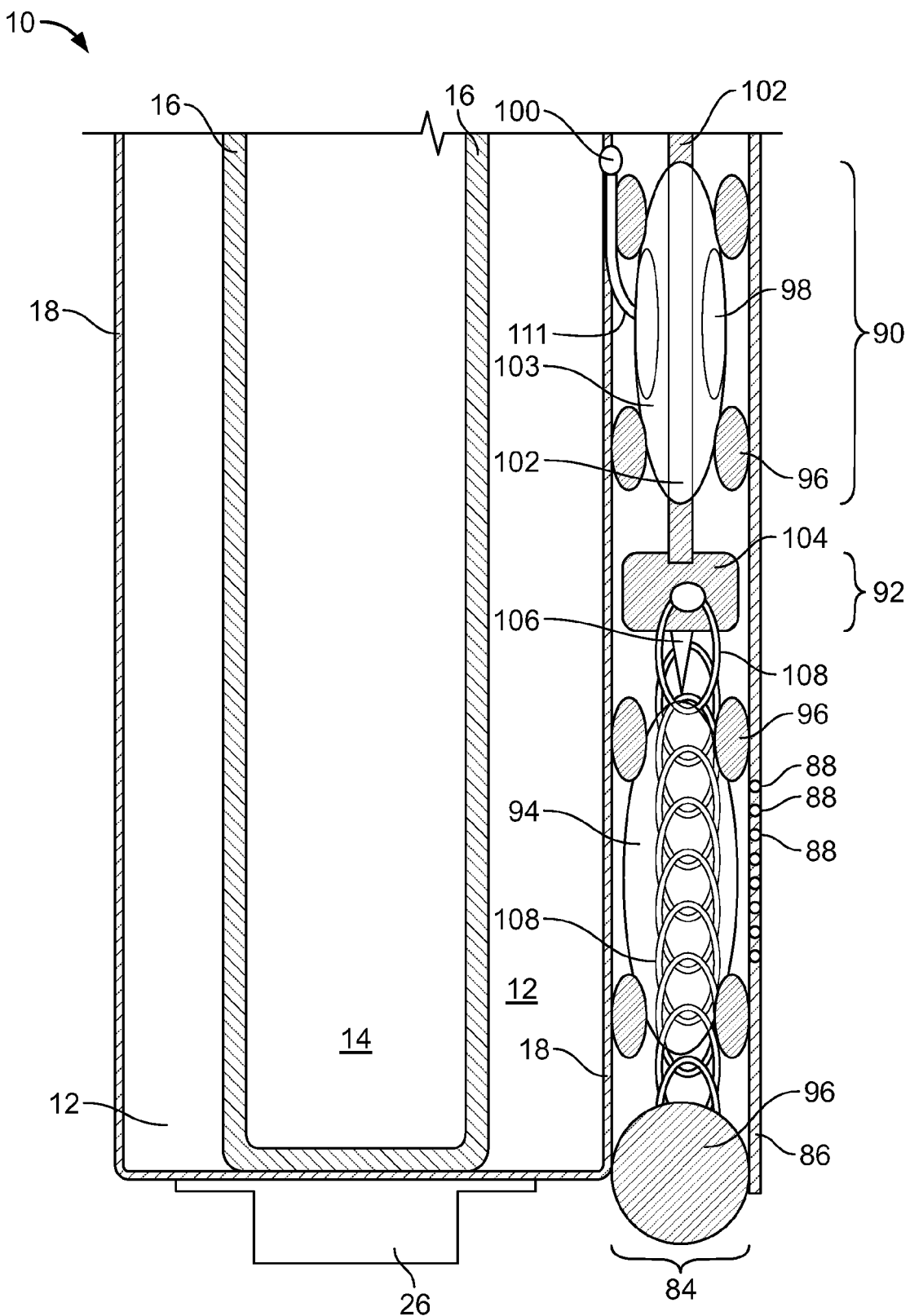

Referring to FIG. 6, a different type of battery-life indicator 84 is arranged in a different manner with respect to a battery 10 (components not all shown) than those described in FIGS. 1-2 and 3-4 to indicate the usage of battery 10 by fragrance release. In the example shown in the figure, battery-life indicator 84 is located external to battery 10 and between housing 18 and a plastic label 86 about housing 18. Battery-life indicator 84 is in, for example, a flat and thin configuration and has a thickness, for example, of about 0.1 mm to about 1.0 mm. Plastic label 86 includes perforations 88 that facilitate the release of fragrance from battery-life indicator 86 to the user.

Battery-life indicator 84 includes an actuator cell 90, a pierce unit 92, and a fragrance capsule 94. Actuator cell 90 and fragrance capsule 94 are fixed to housing 18 and plastic label 86 by adhesives 96 made, for example, of epoxy, hot melt, polyurethane or rubber cement. Actuator cell 90 is connected to battery 10 in parallel and includes a cathode 98 electrically connected to housing 18 of battery 10 by, for example, a weld bead 100 and a wire lead 111 and an anode 102 connected to the negative terminal of battery 10 (not shown). In the example shown in the figure, anode 102 is in the form of a metal strip, for example, a zinc or iron strip. Cathode 98 includes a cathode active material, for example, $\beta MnO_2$ or CuO, and an electrolyte solution 103 which is dispersed within cell 90. The materials in each component of cell 90 are selected so that cell 90 has a normal open circuit voltage similar to the lower operating voltage limit of a device in which battery 10 is used, for example, about 0.7 V to about 0.85 V, as described above. When the voltage of battery 10 falls below the normal open circuit voltage of cell 90, cell 90 discharges and the metal strip of anode 102 reacts with electrolyte solution 103 and corrodes. The dimensions of the metal strip are selected so that after cell 90 discharges for a certain amount of time, for example, 10 minutes, the metal strip breaks.

Pierce unit 92 includes a link 104 having one end attached to the metal strip of anode 102 and the opposite end attached to a pierce point 106. Pierce unit 92 is also connected to a tension spring 108 having one end connected to link 104 and the other end fixed, for example, to adhesive 96. Fragrance capsule 94 is located in the vicinity of pierce point 106. When the metal strip of anode 102 breaks, spring 108 contracts and draws pierce point 106 to pierce capsule 94 to release the fragrance. Fragrance capsule 94 has similar properties to capsules 42 described above and contains similar fragrance agents to those capsules 42 contain.

In other embodiments, fragrance released from capsules 42 or 94 is not instantly released to the external environment around battery 10, but can be released to a user at a chosen time. For example, perforations 88 of FIG. 6 can be covered by a tape and the user can open the perforations, for example, by peeling off the tape, at times when the user wishes to monitor the state of discharge of battery 10.

In some embodiments, a fresh battery 10 of FIGS. 1, 2, 4, 5, and 6 can be coated or impregnated with a fragrance different from the one to be released from the battery-life indicators to indicate the freshness of the battery when it is first removed from a package. The fragrance signifying the freshness of the battery can be, for example, softer than the fragrance contained in the battery-life indicators. For example, the freshness indicating fragrance can be lilac, rose, lavender, jasmine, apple blossom, cherry blossom or others.

Battery 10 can be a conventional alkaline battery. Referring back to FIG. 1, cathode 12 includes one or more cathode active materials. They may also include carbon particles, a binder, and other additives.

Examples of cathode active material include manganese dioxide, nickel oxyhydroxide, silver oxide, and copper oxide. Generally the cathode may include, for example, between 80 wt % and 90 wt %, and preferably between 86 wt % and 88 wt %, of cathode active material.

Manganese dioxide can be in any of the conventional forms used for cathodes. For example, the manganese dioxide can be electrolytic manganese dioxide (EMD) or chemical manganese dioxide (CMD). Distributors of manganese dioxides include Tronox (Tronox AB grade), Erachem, Tosoh, Delta Manganese, Mitsui Mining and Smelting, and Xiangtan.

Processes for the manufacture of EMD and representative properties thereof are described in "Batteries", edited by Karl V. Kordesch, Marcel Dekker, Inc., New York, Vol. 1, 1974, pp. 433-488, which is incorporated by reference in its entirety. EMD is the preferred type of manganese dioxide for use in alkaline cells.

The carbon particles may be graphite particles. The graphite can be synthetic graphite including an expanded graphite, non-synthetic graphite, natural graphite including expanded natural graphite, or a blend thereof. Suitable natural graphite particles can be obtained from, for example, Brazilian Nacional de Grafite (Itapecerica, MG Brazil, NdG MP-0702x grade) or Superior Graphite Co. (Chicago, Ill., ABG-grade). Suitable expanded graphite particles can be obtained, for example, from Chuetsu Graphite Works, Ltd. (Chuetsu grades WH-20A and WH-20AF) of Japan or Timcal America (Westlake, Ohio, BNB90 grade). The cathode can include, for example, between 2 wt % and 10 wt %, between 3 wt % and 8 wt %, or between 4 wt % and 6 wt % of conductive carbon particles.

Examples of binders include polyethylene, polyacrylic acid, or a fluorocarbon resin, such as PVDF or PTFE. An example of a polyethylene binder is sold under the trade name COATHYLENE HA-1681 (available from Hoechst or DuPont). The cathode can include, for example, between 0.1 wt % and 4 wt %, or between 0.5 wt % and 2 wt % binder.

Examples of other additives are described in, for example, U.S. Pat. Nos. 5,698,315, 5,919,598, and 5,997,775 and U.S. application Ser. No. 10/765,569.

The weight percentages provided above and below are determined after addition of the electrolyte solution in cathode 12. The electrolyte can be an aqueous solution of alkali hydroxide, such as potassium hydroxide or sodium hydroxide. The electrolyte can contain between 15 wt % and 60 wt %, between 20 wt % and 55 wt %, or between 30 wt % and 50 wt % of alkali hydroxide dissolved in water.

Anode 14 can be formed of an anode active material, a gelling agent, and minor amounts of additives, such as gassing inhibitors. In addition, a portion of the electrolyte solution discussed above is dispersed throughout the anode.

Examples of the anode active material include zinc. Any of the standard zinc materials can be used in battery anodes. For example, anode 14 can include a zinc slurry that includes zinc metal particles. The zinc particles can be any of the zinc particles conventionally used in slurry anodes. Examples of zinc particles include those described in U.S. Pat. Nos. 6,284,410 and 6,521,378, and U.S. application Ser. No. 09/115,867, each of which is hereby incorporated by reference in its entirety. The anode can include, for example, between 60 wt % and 80 wt %, between 65 wt % and 75 wt %, or between 67 wt % and 71 wt % of anode active materials.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid includes CARBOPOL 940 and 934 (available from B.F. Goodrich) and POLYGEL 4P (available from 3V), and an example of a grafted starch material includes WATERLOCK A221 or A220 (available from Grain Processing Corporation, Muscatine, Iowa). An example of a salt of a polyacrylic acid includes ALCOSORB G1 (available from Ciba Specialties). The anode can include, for example, between, between 0.05 wt % and 2 wt %, or between 0.1 wt % and 1 wt % of gelling agent.

A gassing inhibitor can include an inorganic material, such as bismuth, tin, or indium metals or compounds of bismuth, tin or indium. Alternatively, a gassing inhibitor can include an organic compound, such as a phosphate ester, an ionic surfactant or a nonionic surfactant. Examples of ionic surfactants are disclosed in, for example, U.S. Pat. No. 4,777,100, which is hereby incorporated by reference in its entirety.

Separator 16 can be a conventional alkaline battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of about 54 grams per square meter, a thickness of about 5.4 mils when dry and a thickness of about 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent to the cathode 12, or the anode 14. The non-woven material can contain from 78 wt % to 82 wt % polyvinyl alcohol and from 18 wt % to 22 wt % rayon with a trace amount of a surfactant, such as non-woven material available from PDM under the tradename PA25.

Housing 18 can be a conventional housing commonly used in primary alkaline batteries, for example, nickel plated cold-rolled steel. Optionally, a layer of conductive material can be disposed between the inner wall and cathode 12. The layer can be disposed along the inner surface of the inner wall, along the circumference of cathode 12. The conductive layer can be formed, for example, of a carbonaceous material (e.g., colloidal graphite), such as LB1000 (Timcal), Eccocoat 257 (W.R. Grace & Co.), Electrodag 109 (Acheson Colloids Company), Electrodag EB-009 (Acheson), Electrodag 112 (Acheson) and EB0005 (Acheson). Methods of applying the conductive layer are disclosed in, for example, Canadian Patent No. 1,263,697, which is hereby incorporated by reference in its entirety. Optionally, a corrosion-resistant coating such as gold, electroless nickel plating or titanium carbonitride can be applied to the inner metal wall of the housing.

Current collector 20 can be made from a suitable metal, such as brass. Seal 22 can be made, for example, of a nylon.

In some embodiments, actuator cells having a rigid housing or a flexible housing can also be used in an air-shutter controller in a metal-air battery, for example, a zinc-air battery. In the example shown in FIG. 7, a zinc-air battery 110 includes an air-shutter controller that includes an inner slidable housing 116 having perforations 118 and capable of sliding along a sliding direction parallel to the longitudinal axis of battery 110, a spring 120, for example, a compressed spring, located between a negative terminal 122 and one end 124 of inner slidable housing 116 to exert a force on the slidable housing along the sliding direction, and an actuator cell 126 that has similar features as actuator cell 34 and is fixed to the opposite end 128 of the inner slidable housing near a positive terminal 130 of battery 110. The air-shutter controller can align or misalign perforations 114 of an outer housing 112 with perforations 118 of an inner housing 116 by sliding inner housing 116, thereby opening or closing the interior of battery 10 to the ambient atmosphere.

The perforations in the inner and outer housings have similar sizes, for example, a width of about 0.5 mm to about 2 mm, a length of about 0.5 mm to about 2 mm and density, for example, of about 10 holes per linear cm to about 2.5 holes per linear cm, along the sliding direction. The solid portions of inner housing 116 and outer housing 112 which separate adjacent perforations have a width or length dimension which is equal to or greater than the corresponding dimension of the perforations 114 in outer housing 112 and perforations 118 in inner housing 116, respectively. Actuator cell 126 includes a lead (not shown) extending from the cathode and connected to positive terminal 130 and a pierce point 140 electrically in communication with negative terminal 122 so that actuator cell 126 is electrically connected to battery 110 in parallel. An insulating bushing is arranged between the inner housing 116 and the actuator cell 126 to prevent the cell from shorting. Battery 110 also includes an air cathode 132 made, for example, of activated carbon, and/or carbon black, a fluorocarbon resin binder, e.g., Teflon, and a catalyst such as a transition metal oxide e.g. a manganese oxide or a platinum group metal. A zinc slurry anode 134 containing, for example, a zinc powder, a gelling agent such as poly acrylic acid, a KOH electrolyte solution, and gassing inhibitors including inorganic gassing inhibitors such as indium, bismuth, lead, mercury, or salts of these metals and/or organic gassing inhibitors such as ionic or non-ionic surfactants. Zn powder can be 60 wt % to 80 wt %, for example, about 65 wt % to about 70 wt % of the slurry. Gelling agent may be about 0.1 wt % to 2.0 wt % of the slurry. Inorganic gassing inhibitors consisting of metals, their oxides or salts can constitute 50 ppm to 1000 ppm by weight of zinc. All or part of the metallic inhibitors can be included as alloy constituents in the zinc powder. Organic gassing inhibitors may range from 20 ppm to 500 ppm by weight of zinc. The balance of the slurry is aqueous potassium hydroxide electrolyte, typically with a KOH concentration of 25 wt % to 40 wt % and containing 1% to 4% of dissolved zinc oxide. The anode slurry 134 is separated from cathode 132 by a separator 142, and a current collector 136 is disposed within the anode 134. Conventional zinc-air batteries are described, for example, in U.S. Pat. No. 6,500,576, U.S. Pat. No. 6,879,855, U.S. Pat. No. 7,001,439, and U.S. Pat. No. 7,001,689.

Typically, zinc-air battery 110 has an open circuit voltage of about 1.44 V and a running voltage of about 1.0 V to about 1.2 V when used on applications. When the battery is not in use, it is desirable to keep cathode 132 from communicating with the ambient atmosphere (nitrogen, oxygen, argon, water vapor and carbon dioxide) so that no undesired exchange of gas or vapors can take place, which can cause the battery to suffer a performance loss. Particularly detrimental is the absorption of carbon dioxide which carbonates the electrolyte, resulting in the deposition of solid carbonates on the cathode and in the air holes to block the access of oxygen. In addition, excessive water loss to the ambient air (dry out) or excessive water gain from the ambient air (flooding) can also be objectionable. In the example shown in FIG. 7A, the inner housing slides to a position so that perforations 118 in the inner housing 116 are blocked or covered by solid portions of housing 112 and perforations 114 in the outer housing 112 are blocked or covered by solid portions of housing 118. The inner slidable housing 116 acts as an air shutter and shuts the air external to cathode 132. When the battery is in use and the running voltage of the battery gradually decreases toward the minimum operating voltage of the application, for example, about 0.9 V, it is desirable to have the air shutter gradually open to introduce air into cathode 132 and allow electrochemical reactions between oxygen and zinc to generate current.

The normal open circuit voltage of the actuator cell 126 can be selected to be about 0.9 V to about 1.35 V. The anode materials, cathode materials, and electrolyte contained in the anode and cathode of the actuator cell are similar to those contained in actuator cell 34. In particular, to obtain the desired open circuit voltage, the anode material, cathode material, and electrolyte can be selected from the following combinations: {iron, $\gamma MnO_2$ and potassium hydroxide solution} or {nickel, $\gamma MnO_2$ and sodium acetate solution} or {nickel, $\gamma MnO_2$ and mixed nickel fluoride and ammonium fluoride solutions} or {iron or nickel, $\gamma NiOOH$ and potassium hydroxide solution}. Similar to actuator cell 34, actuator cell 126 shrinks by about 8% to about 30% of its volume when it is discharged and it is rechargeable.

Figure 7:
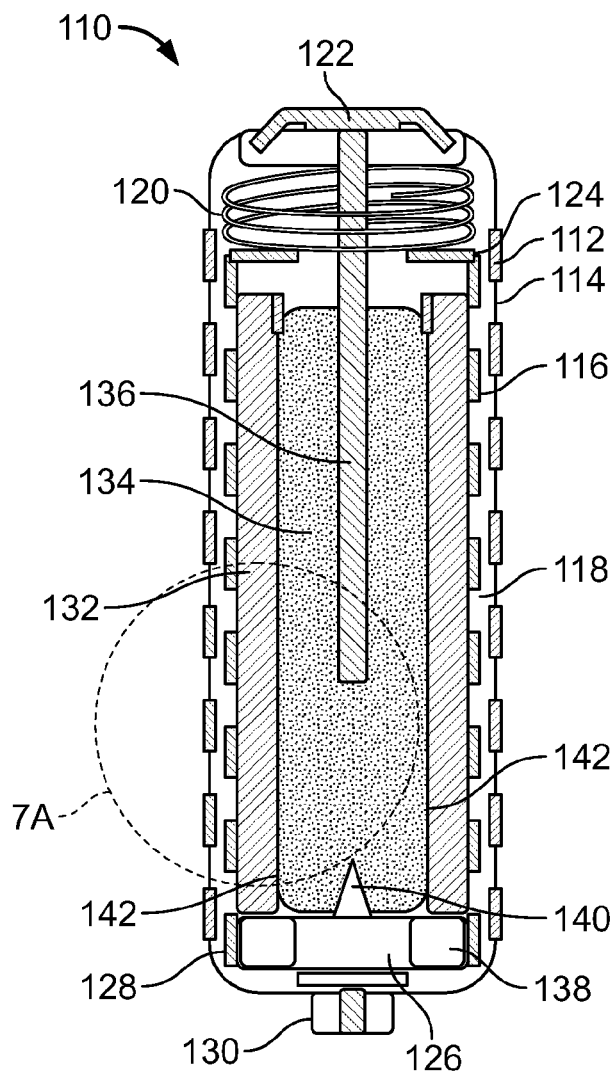
Figure 7A:
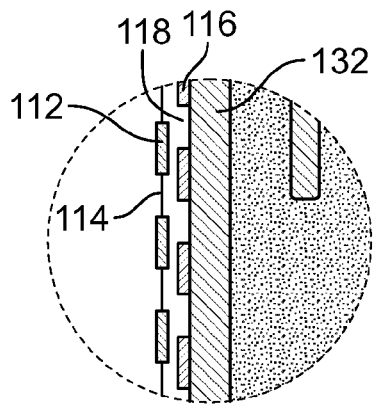
FIGS. 7A and 7B are schematic diagrams of portions of the battery of FIG. 7.
Figure 7B:
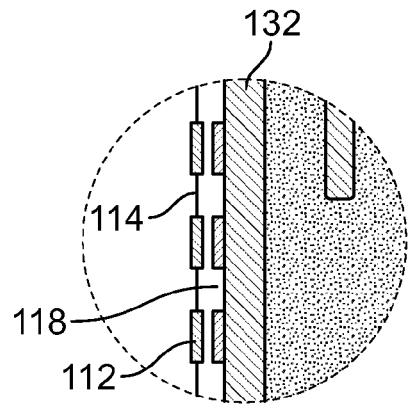

When battery 110 of FIG. 7 is used in an application, the running voltage of the battery drops gradually. When the voltage reaches the normal open circuit voltage of actuator cell 126 and continues dropping, the actuator cell starts discharging and the volume of its internal components shrinks. The piston (not shown) of the actuator cell and/or spring 120 pushes against inner housing 112 to cause it to slide toward positive terminal 130. Perforations 114 and 118 become partially aligned, exposing the cathode of battery 110 to the ambient atmosphere so that air can enter the battery through these perforations. As the running voltage of battery 110 further decreases towards the minimum operating voltage of about 0.9 V, the inner housing 116 keeps sliding toward positive terminal 130 until the perforations 114 and 118 are fully aligned, as shown in FIG. 7B. Once the perforations are fully aligned, a maximum amount of air can enter and the battery is able to operate at its maximum power level. When the device powered by battery 110 reaches the end of a duty cycle, or is completely switched off, the battery will recover to its open circuit voltage of about 1.44 V. Actuator cell 126, which remains electrically connected in parallel to the battery 110, is recharged by battery 110 to about 1.44V and recovers its initial shape and volume. The inner housing 116 then returns to its position in FIG. 7A with perforations misaligned (closed) and air access to the interior of battery 110 is again denied.

Other embodiments are in the following claims.

What is claimed is:

1. A battery comprising:
   a housing;
   a cathode and an anode within the housing; and
   a battery-life indicator comprising a fragrance that is released to indicate usage of the battery;
   wherein the battery-life indicator comprises an actuator cell including an anode and a cathode.

2. The battery of claim 1, wherein the actuator cell comprises a flexible housing.

3. The battery of claim 1, wherein the actuator cell has a normal open circuit voltage of about 0.7 V to about 1.35 V.

4. The battery of claim 1, wherein the actuator cell changes its total volume by about 8% to about 20% when it is discharged.

5. The battery of claim 1, wherein the actuator cell is electrically connected to the battery in parallel.

6. The battery of claim 1, wherein the actuator cell has a normal open circuit Voltage lower than that of the battery and discharges when the running voltage of the battery falls below the normal open circuit voltage of the actuator cell.

7. The battery of claim 1, wherein the battery-life indicator also comprises a supporting plate and a piston in connection with the actuator cell and the supporting plate.

8. The battery of claim 7, wherein the battery-life indicator also comprises a compression spring supported by the supporting plate, wherein the spring is positioned so as to push the supporting plate towards the actuator cell.

9. The battery of claim 7, wherein the battery-life indicator also comprises a tension spring connected to the supporting plate, wherein the spring is positioned so as to pull the supporting plate towards the actuator cell.

10. The battery of claim 7, wherein the battery-life indicator also comprises a pierce point connected to the supporting plate.

11. The battery of claim 1, wherein the actuator cell comprises a corrodible anode.

12. The battery of claim 11, wherein the battery-life indicator also includes a capsule containing a fragrance agent and the corrodible anode is in the form of a strip in communication with the capsule.

13. The battery of claim 12, wherein the battery-life indicator also includes a pierce point between the corrodible anode and the capsule so that when the corrodible anode strip is corroded to break, the pierce point is activated to piece the capsule to release a fragrance from the fragrance agent.

14. The battery of claim 13, wherein the battery-life indicator also includes a tension spring so that when the corrodible anode strip is corroded to break, the tension spring draws the pierce point into the capsule, piercing it to release a fragrance from the fragrance agent.

15. The battery of claim 1, wherein the battery-life indicator comprises a capsule containing a fragrance agent.

16. The battery of claim 1, wherein the battery comprises a hollow pip external to the housing and being a positive terminal of the battery and the battery-life indicator is at least partially located within the hollow pip.

17. The battery of claim 1, wherein the battery comprises a label about the housing and the battery-life indicator is between the housing and the label.

* * * * *